（12）United States Patent
Savir et al.

(10) Patent No.: US 11,748,405 B2
(45) Date of Patent: Sep. 5, 2023

(54) METHOD AND APPARATUS FOR PRESENTING SEARCH RESULTS

(71) Applicant: EMC IP Holding Company LLC, Hopkinton, MA (US)

(72) Inventors: Amihai Savir, Sansana (IL); Anat Parush Tzur, Be'er Sheva (IL); Or Herman Saffar, Ofakim (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 17/502,102

(22) Filed: Oct. 15, 2021

(65) Prior Publication Data

US 2023/0117678 A1 Apr. 20, 2023

(51) Int. Cl.
  *G06F 7/00* (2006.01)
  *G06F 16/738* (2019.01)
  *G06F 16/735* (2019.01)
  *G06F 3/04817* (2022.01)

(52) U.S. Cl.
  CPC .......... *G06F 16/739* (2019.01); *G06F 16/735* (2019.01); *G06F 3/04817* (2013.01)

(58) Field of Classification Search
  CPC ... G06F 16/739; G06F 16/735; G06F 3/04817
  See application file for complete search history.

(56) References Cited

U.S. PATENT DOCUMENTS

| 7,185,054 | B1* | 2/2007 | Ludwig | H04L 65/1101 |
| | | | | 348/E7.083 |
| 9,426,543 | B1* | 8/2016 | Li | H04N 21/2353 |
| 11,501,780 | B2* | 11/2022 | Adlersberg | G06F 16/685 |
| 11,503,159 | B1* | 11/2022 | Holland | H04M 3/5183 |
| 2001/0049826 | A1* | 12/2001 | Wilf | H04N 21/64322 |
| | | | | 725/120 |
| 2004/0095377 | A1* | 5/2004 | Salandro | G11B 27/11 |
| | | | | 348/700 |
| 2007/0043713 | A1* | 2/2007 | Eimi | G06Q 30/0259 |
| 2008/0046406 | A1* | 2/2008 | Seide | G06F 16/7328 |
| 2008/0086688 | A1* | 4/2008 | Chandratillake | G06F 16/738 |
| | | | | 707/E17.028 |
| 2008/0154889 | A1* | 6/2008 | Pfeiffer | G06F 16/738 |
| | | | | 707/999.005 |
| 2009/0182726 | A1* | 7/2009 | Wang | G06F 16/90335 |
| | | | | 707/999.005 |
| 2009/0210226 | A1* | 8/2009 | Ma | G10L 15/26 |
| | | | | 704/236 |
| 2009/0300520 | A1* | 12/2009 | Ashutosh | H04L 12/1831 |
| | | | | 715/756 |
| 2009/0319941 | A1* | 12/2009 | Laansoo | G06F 16/2477 |
| | | | | 707/999.005 |

(Continued)

*Primary Examiner* — Mohammed R Uddin
(74) *Attorney, Agent, or Firm* — DALY, CROWLEY MOFFORD & DURKEE, LLP

(57) ABSTRACT

A method, comprising: receiving a first search query that is associated with a video file; retrieving one or more search results in response to the first search query, each of the search results corresponding to a different section in the video file; and displaying the search results on a display device, wherein displaying any of the search results includes displaying a link that points to the section of the video file, which corresponds to the search result.

20 Claims, 9 Drawing Sheets

(56) References Cited

U.S. PATENT DOCUMENTS

| | | | | |
|---|---|---|---|---|
| 2010/0158232 A1* | 6/2010 | Sylvain | .............. | H04L 65/4038 |
| | | | | 379/202.01 |
| 2011/0093784 A1* | 4/2011 | Kiraz | .................... | G06F 40/169 |
| | | | | 715/719 |
| 2012/0276513 A1* | 11/2012 | Ayers | ..................... | G09B 19/00 |
| | | | | 434/310 |
| 2013/0018895 A1* | 1/2013 | Harless | ................... | G06F 16/73 |
| | | | | 707/E17.014 |
| 2013/0326573 A1* | 12/2013 | Sharon | ................... | H04H 60/73 |
| | | | | 725/115 |
| 2014/0282089 A1* | 9/2014 | West | ..................... | H04M 3/565 |
| | | | | 715/753 |
| 2015/0227624 A1* | 8/2015 | Busch | ................... | G06F 16/951 |
| | | | | 707/728 |
| 2016/0105566 A1* | 4/2016 | Klemm | ................... | H04L 51/04 |
| | | | | 379/202.01 |
| 2016/0165150 A1* | 6/2016 | Ayers | ................... | G06Q 10/101 |
| | | | | 348/239 |
| 2019/0156822 A1* | 5/2019 | Manuvinakurike | ..... | G10L 25/78 |
| 2019/0259377 A1* | 8/2019 | Mertens | ................ | G06F 16/638 |
| 2019/0378502 A1* | 12/2019 | Bostick | ................... | G06F 40/30 |
| 2020/0125316 A1* | 4/2020 | Gruebele | ............. | G06F 1/3275 |
| 2020/0126559 A1* | 4/2020 | Ochshorn | ............. | G11B 27/031 |
| 2020/0126583 A1* | 4/2020 | Pokharel | ............. | G10L 15/1822 |
| 2021/0056860 A1* | 2/2021 | Fahrendorff | ............ | G06Q 10/10 |
| 2021/0271701 A1* | 9/2021 | Zhiwen | .............. | G06V 10/7635 |
| 2021/0406735 A1* | 12/2021 | Nahamoo | ................ | G06N 3/08 |
| 2022/0365892 A1* | 11/2022 | Chen | ................... | G06F 13/1673 |

\* cited by examiner

METHOD AND APPARATUS FOR PRESENTING SEARCH RESULTS

BACKGROUND

Videoconference calls have many advantages. Videoconference calls allow people to meet and collaborate without having to be present in the same physical location. In addition, videoconference calls can be saved as video data. Once saved, the content of saved video files can be accessed and shared as desired. The video files corresponding to videoconference calls become a valuable resource.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

According to aspects of the disclosure, a method is provided, comprising: receiving a first search query that is associated with a video file; retrieving one or more search results in response to the first search query, each of the search results corresponding to a different section in the video file; and displaying the search results on a display device, wherein displaying any of the search results includes displaying a link that points to the section of the video file, which corresponds to the search result.

According to aspects of the disclosure, a system is provided, comprising: a memory; and at least one processor that is configured to perform the operations of: receiving a first search query that is associated with a video file; retrieving one or more search results in response to the first search query, each of the search results corresponding to a different section in the video file; and displaying the search results on a display device, wherein displaying any of the search results includes displaying a link that points to the section of the video file, which corresponds to the search result.

According to aspects of the disclosure, a non-transitory computer-readable medium is provided that stores one or more processor-executable instructions, which, when executed by at least one processor, cause the at least one processor to perform the operations of: receiving a first search query that is associated with a video file; retrieving one or more search results in response to the first search query, each of the search results corresponding to a different section in the video file; and displaying the search results on a display device, wherein displaying any of the search results includes displaying a link that points to the section of the video file, which corresponds to the search result.

BRIEF DESCRIPTION OF THE DRAWING FIGURES

Other aspects, features, and advantages of the claimed invention will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features.

DETAILED DESCRIPTION

Figure 1:
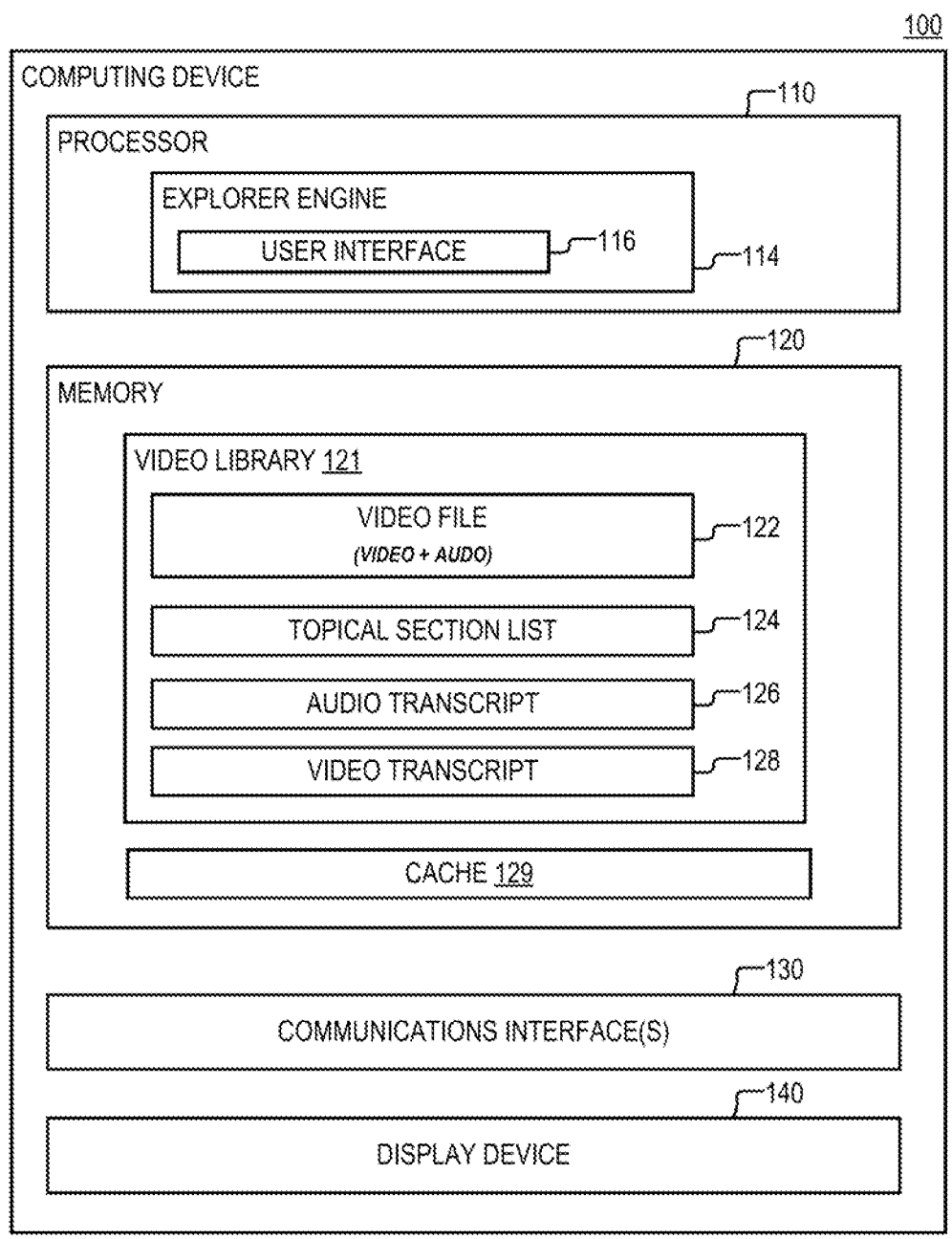
FIG. 1 is a diagram of an example of a computing device, according to aspects of the disclosure.

FIG. 1 is a diagram of an example of a computing device 100, according to aspects of the disclosure. The computing device 100 may include a desktop computer, a laptop computer, a smartphone, and/or any other suitable type of computing device. As illustrated, the computing device may include a processor 110, a memory 120, a communications interface 130, and a display device 140. The processor 110 may include any suitable type of processing circuitry, such as one or more of an application-specific integrated circuit (ASIC), a field-programmable gate array (FPGA), and/or a general-purpose processor (e.g., an ARM-based processor, an x86 processor, etc.). The memory 120 may include any suitable type of volatile and/or non-volatile memory. For example, in some implementations, the memory 120 may include one or more of random-access memory (RAM), a read-only memory (ROM), a solid-state drive (SSD), electrically erasable programmable read-only memory (EEPROM), network-accessible storage (NAS), a redundant array of independent disks (RAID) and/or any other suitable type of memory. The communications interface 130 may include a Bluetooth interface, a Wi-Fi interface, a ZigBee interface, a Universal Serial Bus (USB) interface, and/or any other suitable type of interface. Although in the example of FIG. 1 the device 100 is depicted as an integrated system, it will be understood that alternative implementations are possible in which the device 100 is a distributed system, comprising a plurality of computing devices that are connected to one another via a communications network.

The memory 120 may be configured to store a video library 121 and a cache 129. The video library 121 may include a video file 122, a section list 124, an audio transcript 126, and a video transcript 128. The video file 122, according to one example, is a recording of a conference call (e.g., a Zoom™ call or a Teams™ call). The section list may identify a plurality of sections of the video file 122. Each section may be identified in the section list 124 by the section's beginning timestamp or any other suitable identifier. The audio transcript 126 may include a text transcript of the audio track of the video file 121. The audio transcript 126 may be generated by using any suitable speech-to-text software (or utility). The audio transcript 126 may identify sentences (or blocks of sentences) that are spoken in the video file 122. For each sentence (or block of sentences) the audio transcript may provide a timestamp that identifies the temporal location in the video file 122 where the sentence (or block of sentences) is spoken. The timestamp for each sentence (or block of sentences) may be used to relate the sentence (or block of sentences) to the section of the video file 122 in which the sentence (or block of sentences) is spoken The video transcript 128 may identify text that is displayed in the video frames of the video 124. For each (or at least some) of the frames in the video file 124, the video transcript may identify text that is displayed in the frame. For instance, if the frame shows a PowerPoint™ slide, the video transcript 128 may identify text that is part of the PowerPoint Slide™. The video transcript file 128 may be generated by using any suitable type of software or utility for optical character recognition. Further information regarding the implementation and use of the video library 121 can be found in U.S. patent application Ser. No. 17/443,113, filed on Jul. 21, 2021, and entitled EFFICIENT EXPLORER FOR RECORDED MEETINGS, which is herein incorporated by reference in its entirety. Additionally or alternatively, in some implementations, the video transcript may identify objects that are depicted in different frames of the video file. For example, if a frame shows an image of an "automobile" or an "elephant", the video transcript 128 may include the word "car" or the word "elephant."

The cache 129 may include one or more data structures that are configured to store information about searches of the video file 122 that have been performed in the past. The cache 129 is discussed further below with respect to FIG. 3. Although in the example of FIG. 3 the cache 129 is depicted as a table, it will be understood that the present disclosure is not limited to any specific implementation of the cache 129. For the purpose of clarity, in the example of FIG. 1, the cache 129 is limited to caching information of prior searches of the video file 122 only. However, in many practical implementations, the cache 129 may store information about prior searches of different video files.

The processor 110 may be configured to execute an explorer engine 114 (hereinafter "engine 114"). The engine 114 may include any suitable type of software that is configured to respond to search queries regarding the video file 122. As noted above, the video file may be a recording of a conference call. A search query for the video file 122 may include a question about something that was discussed during the conference call. The question may concern something that was said during the conference call and/or information presented in visual aids (e.g., PowerPoint slides) that were shown during the conference call (e.g., which may be part of a screenshare that is recorded in the video file). In addition, the engine 114 may be configured to process the video file 122 to generate the audio transcript 126 and the video transcript 128. Furthermore, the engine 114 may be configured to process the audio transcript 126 and video transcript 128 by using various natural language processing (NPL) techniques to identify portions of the video file that match a particular search query. Furthermore, as illustrated in FIG. 1, the engine 114 may include a search interface 116 for receiving a search query and displaying search results in response to the search query. Further information regarding the implementation and use of the engine 114 can be found in U.S. patent application Ser. No. 17/443,113, filed on Jul. 21, 2021, and entitled EFFICIENT EXPLORER FOR RECORDED MEETINGS, which is herein incorporated by reference in its entirety.

Figure 2:
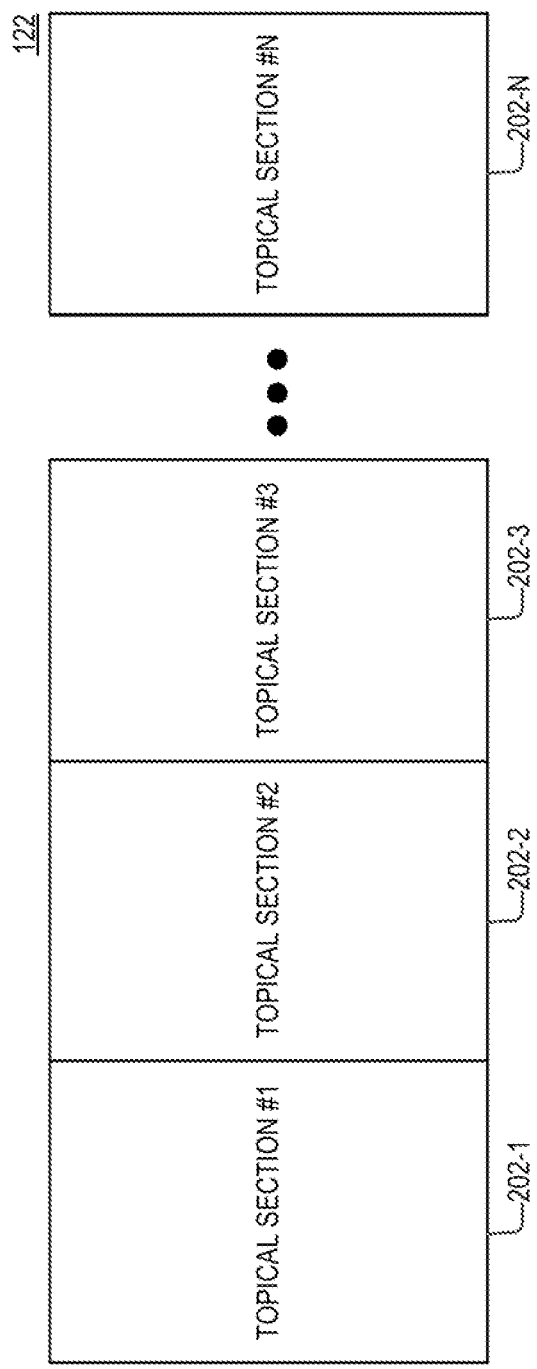
FIG. 2 is a diagram of an example of video file, according to aspects of the disclosure.

FIG. 2 shows an example of the video file 122, according to aspects of the disclosure. In the example of FIG. 2, the video file 122 is divided into sections 202-1 through 202-N, where N is a positive integer. Each of the sections 202 may include a segment of the video file 122 that has been determined (by the engine 114) to contain a discussion of a particular topic. Some of sections 202 may be associated with different topics. Furthermore, it is possible that different sections 202 may be associated with the same topic. For example, section 202-1 may contain a discussion of human resources, section 202-2 may contain a discussion of advertising for a new product, section 202-3 may contain a discussion of sales efforts concerning the new product, and section 202-N may contain a discussion regarding office space. The sections 202 may be identified by processing the audio transcript 126 and/or the video transcript 128. The sections 202 may be identified by using any suitable technique for semantic analysis of text and/or topic identification (e.g., Genism and Latent Dirichlet Allocation, etc.). Although in the example of FIG. 2 the sections 202 are determined by performing semantic analysis of the video file 122. It will be understood that in some implementations, the sections may be determined by dividing the file into even sections, irrespective of the semantic content of the sections. In such implementations, adjacent sections may cover the same topic, whereas in the former case, when a semantic analysis is used to identify the sections, adjacent sections are more likely to cover different topics. Stated succinctly, the present disclosure is not limited to any specific method for dividing the video file 122 into sections 202.

Figure 3:
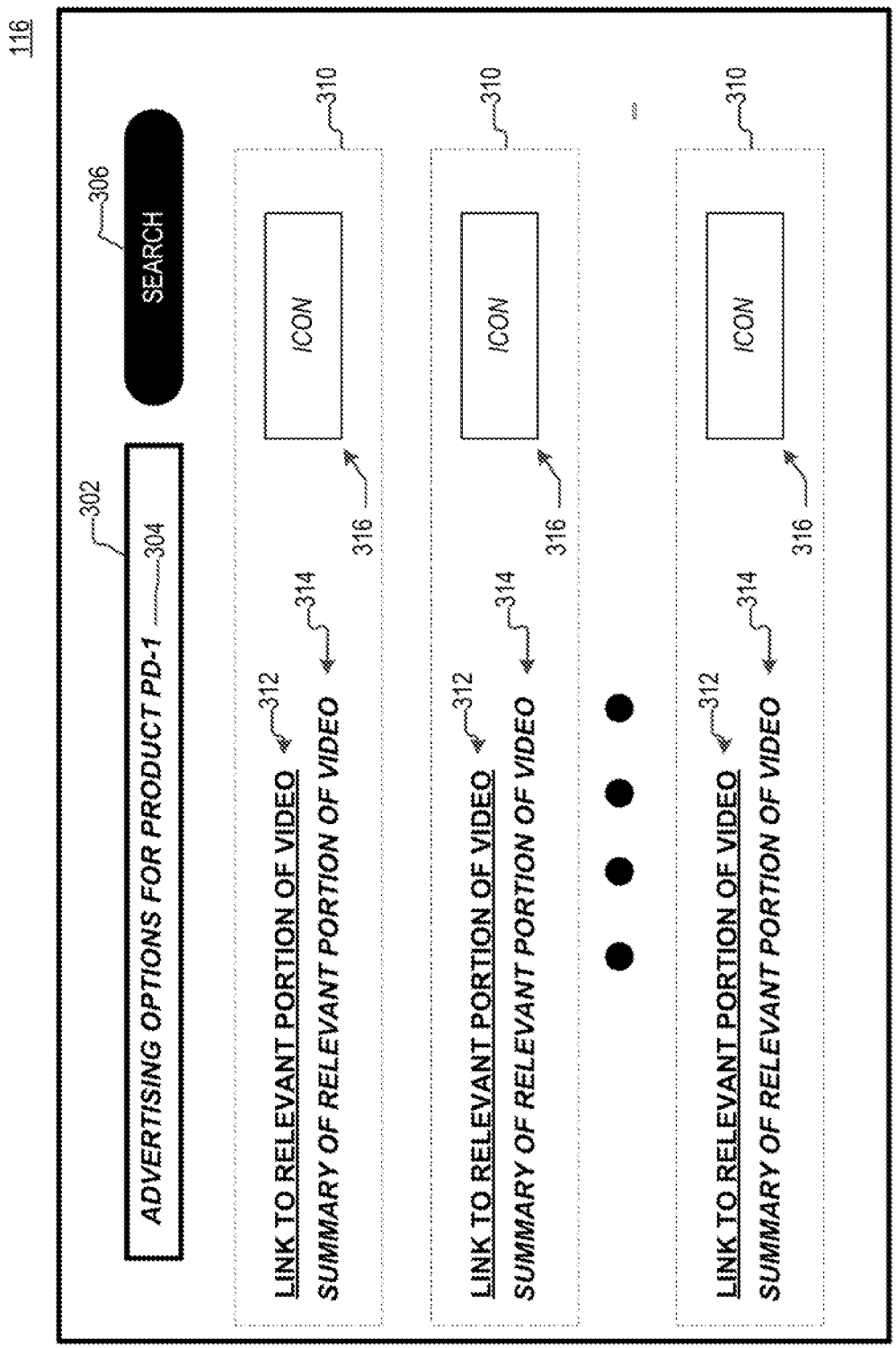
FIG. 3 is a diagram of an example of a search interface, according to aspects of the disclosure.

FIG. 3 is a diagram of the search interface 116, according to one example. The search interface 116 may be displayed on the display device 140. The search interface 116 may include a text input component 302 for receiving a search query 304 and a search button 306. When the search button 306 is pressed, the engine 114 may retrieve one or more search results that match the search query 304. After the search results are retrieved, the engine 114 display search result representations 310 in the search interface 116. Each of search result representations 310 may be generated based on a different one of the search results. Each of the search result representations 310 may include one or more of: (i) a link 312 to a given section 202 of the video file 122, which is part of the search result, (ii) a summary 314 of subject matter discussed in the given section 202, and an icon 316 that is representative of the search result. A link 312 to a given section 202 may include a user interface component (e.g., a button, a text label, etc.), which, when activated, causes the engine 114 to begin playing the video file 122 from the beginning of the respective section 202. So, if the respective section 202 spans a portion of the video file that starts at 2:34 minutes and ends 5:16 minutes, activating the link would cause the video file 122 to start playing at minute 2:34. Although in the present example, the link points to a specific timestamp (or portion) of the video file, alternative implementations are possible in which the link may point to a separate video file, which has been generated by cropping the original file to include only the portion that corresponds to the link (or its associated search result).

The discussion that follows describes examples of different techniques for processing search results. The term "search result" as used throughout the disclosure may refer to one or more of (i) a given section 202 of the video file 122, (ii) a portion of the audio transcript 126 that identifies words that are spoken in the given section 202 of the video file 122 (hereinafter "corresponding audio transcript portion"), (iii) a portion of the video transcript 128 that identifies words that are displayed in the given section 202 of the video file (hereinafter "corresponding video transcript portion"). In this regard, the phrase "comparing the search result" may include comparing a signature (e.g., a Word2Vec or Doc2Vec signature) of at least a part of the corresponding audio transcript portion and/or video transcript portion. In other words, a search result can be generally thought of as a section 202 of the video file 122. However, it will be understood that when the present disclosure discusses that a comparison is performed of the search result, it means a comparison that is performed based on the search result's corresponding audio transcript portion and/or the search result's corresponding video transcript portion. In other words, the phrase "compare a search result" and its inflected forms shall be interpreted as one or both of (i) "performing a comparison based on the search result's corresponding audio transcript portion" or (ii) "performing a comparison based on the search result's corresponding video transcript portion." As noted above, a search result may be referenced by the engine 114 by using timestamp(s) of the search result's corresponding section 202 or in any other suitable manner.

Figure 4:
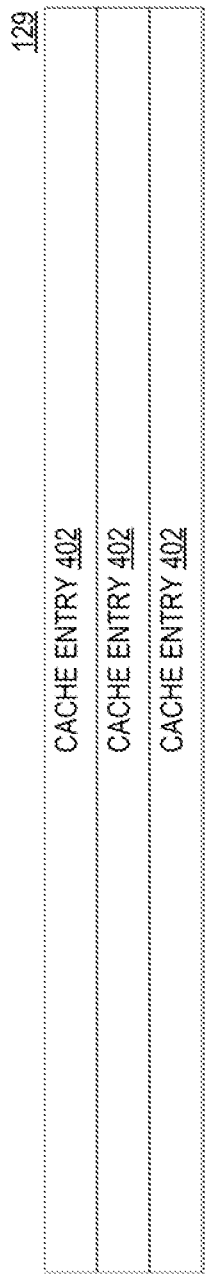
FIG. 4 is a diagram of an example of a cache, according to aspects of the disclosure.
Figure 5:
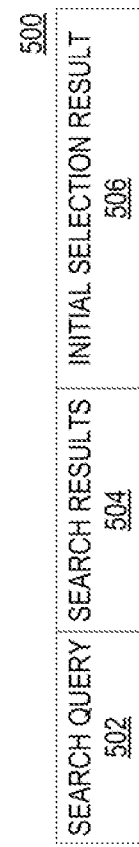
FIG. 5 is a diagram of an example of a cache entry, according to aspects of the disclosure.

FIGS. 4-5 illustrate the cache 129 in further detail. FIG. 4 illustrates that the cache 129 may include a plurality of cache entries 402. Each of the cache entries 402 may be associated with a different search query concerning the video file 122, which has been submitted to the engine 114 in the past. FIG. 5 illustrates an example of a cache entry 500. The cache entry 500 may have the same or similar structure to any of cache entries 402. The cache entry 500 may include a search query 502, that concerns the video file 122, and which has been submitted in the past to the engine 114 (or another entity). The cache entry 500 may include search results 504, which were returned by the engine 114 (or another entity) in response to the search query 502. The cache entry 500 may further identify an initial selection result 506. The initial selection result 506 may be one of the search results 504, which has been selected first by the user who submitted the search query 502. In other words, when the search query 502 was submitted by the user, and the search results 504 were displayed, the initial selection result 506 may be the result that was clicked (or otherwise selected) first by the user.

The term "initial selection result" as used throughout the disclosure may refer to one or more of (i) a given section 202 of the video file 122 (which was returned in response to a prior search query and which was selected first), (ii) a portion of the audio transcript 126 that identifies words that are spoken in the given section 202 of the video file 122 (hereinafter "corresponding audio transcript portion"), (iii) a portion of the video transcript 128 that identifies words that are displayed in the given section 202 of the video file (hereinafter "corresponding video transcript portion"). In this regard, the phrase "comparing the search result to an initial selection result" may include comparing a first signature (e.g., a Word2Vec or Doc2Vec signature) of at least a part of the search result's corresponding audio transcript portion and/or the search result's corresponding video transcript portion to a second signature (e.g., a Word2Vec or Doc2Vec signature) of at least a part of the initial selection result's corresponding audio transcript portion and/or the initial selection result's corresponding video transcript portion. The comparison may be performed by using BERT (Bidirectional Encoder Representations from Transformers model) and/or another similar technique.

Figure 6:
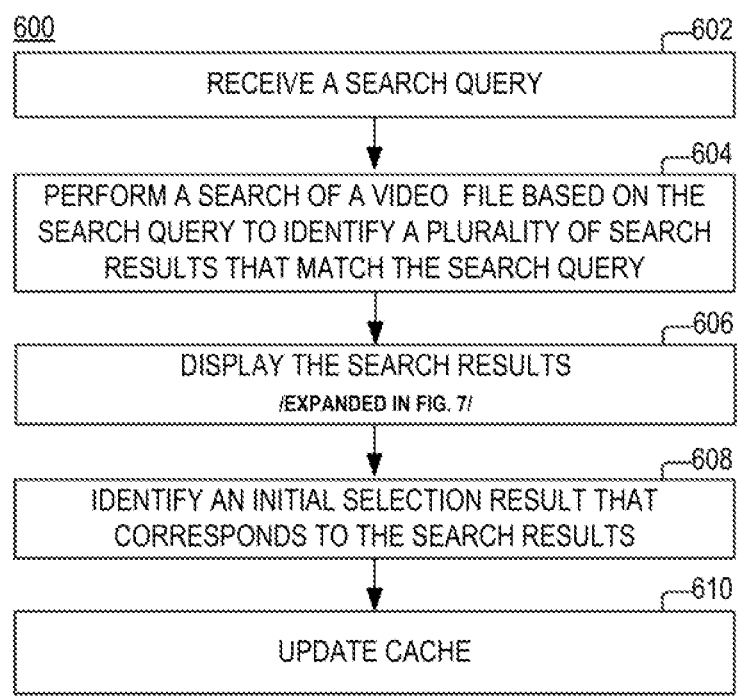
FIG. 6 is a flowchart of an example of a process, according to aspects of the disclosure.

FIG. 6 is a flowchart of an example of a process 600, according to aspects of the disclosure. At step 602, the engine 114 receives a search query for the video file 122. At step 604, the engine 114 performs a search of the video file 122 based on the search query. The search may leverage deep learning algorithms to interpret the search query and its semantic meaning and find results answering the query semantically. As a result of the search, the engine 114 identifies a plurality of search results that match the search query. In some implementations, the search results may be retrieved in the manner discussed in U.S. patent application Ser. No. 17/443,113, filed on Jul. 21, 2021, and entitled EFFICIENT EXPLORER FOR RECORDED MEETINGS, which is herein incorporated by reference in its entirety. At step 606, the engine 114 displays the search results in the search interface 116. At step 608, the engine 114 detects an initial selection of one of the search results. Specifically, the engine 114 detects which one of the search results is clicked (or otherwise selected) first by the user. In other words, at step 608, the engine 114 identifies the initial selection result that corresponds to the search query (received at step 602). At step 610, the engine generates a cache entry 402 that corresponds to the search query (received at step 602) and adds the generated cache entry 402 to the cache 129. The generated cache entry may identify: the search query (received at step 602), the search results (identified at step 604), and the initial selection result (identified at step 608).

Figure 7:
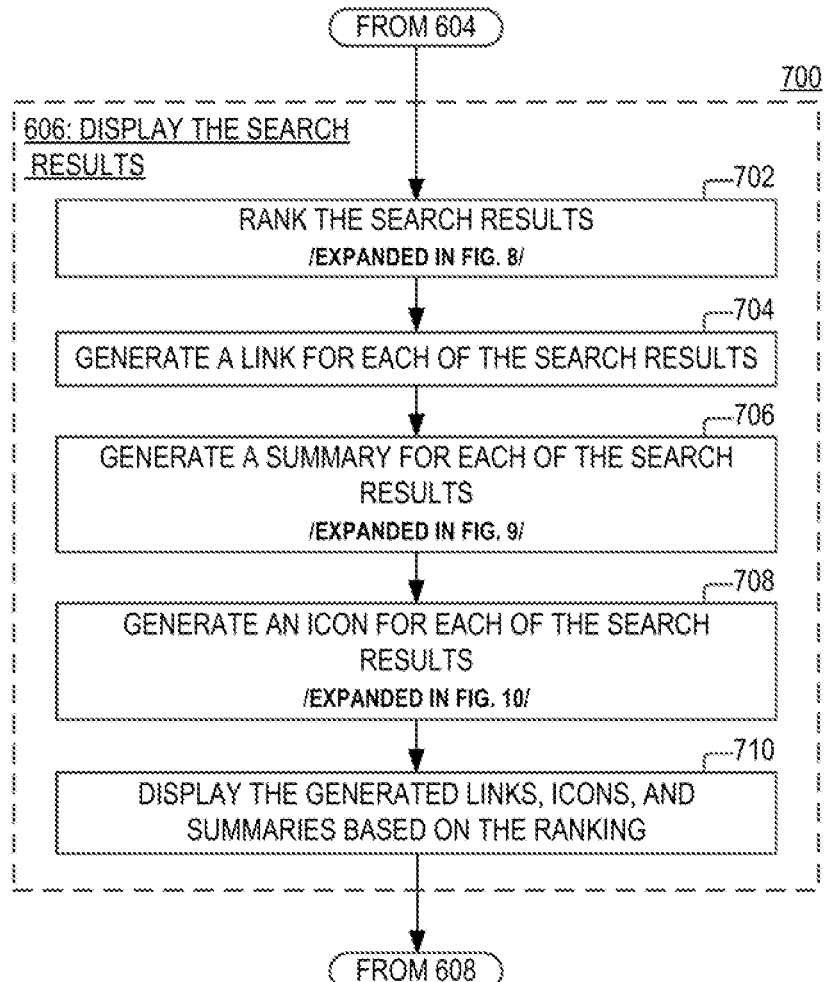
FIG. 7 is a flowchart of an example of a process, according to aspects of the disclosure.

FIG. 7 is a flowchart of an example of a process 700 for displaying search results, as specified by step 606 of the process 600. At step 702, the search results are ranked. Ranking the search results may include identifying one of the search results that is the most relevant (with respect to the search query received at step 602) among all of the search results. Step 702 may be performed in accordance with a process 800, which is discussed further below with respect to FIG. 8. At step 704, a respective link is generated for each (or at least one) of the search results. The respective link for any of the search results may be the same or similar to one of the links 312, which are discussed above with respect to FIG. 3. At step 706, a respective summary is generated for each (or at least one) of the search results. The respective summary for any of the search results may be the same or similar to one of the summaries 314, which are discussed above with respect to FIG. 3. The respective summary for any of the search results may be generated in accordance with a process 900, which is discussed further below with respect to FIG. 9. At step 708, a respective icon is generated for each (or at least one) of the search results. The respective icon for any of the search results may be the same or similar to one of the icons 316, which are discussed above with respect to FIG. 3. The respective icon for any of the search results may be generated in accordance with a process 1000, which is discussed further below with respect to FIG. 10. At step 710, the search results are displayed in accordance with the ranking (performed at step 702).

For example, displaying the search results in accordance with the ranking may include identifying the search result that is ranked first, and rendering (on the display device 140) the link, icon, and summary for the first-ranked search result in a way that causes them to stand out from the links, icons, or summaries of the remaining search results. As another example, the link, icon, and summary for the first-ranked search result may be displayed first—i.e., at the top of a list that contains the links, icons, and summaries for all of the search results. As yet another example, the link, icon, and summary for the first-ranked search result may be displayed to the side of the links, icons, and summaries for the remaining search results. As yet another example, the link, icon, and summary for the first-ranked search result may be displayed in a different color or font size. The phrase "first-ranked search result" shall mean "search result that has been determined to be the most similar (from among all or at least some of search results) to an initial selection result." Although in some implementations it is possible to assign (numerical) ranks to search results. The phrase "first-ranked" should not be interpreted to imply that an actual assignment of a (numerical) rank is performed beyond comparing the search result to the initial selection result and determining that it is the most similar.

Figure 8:
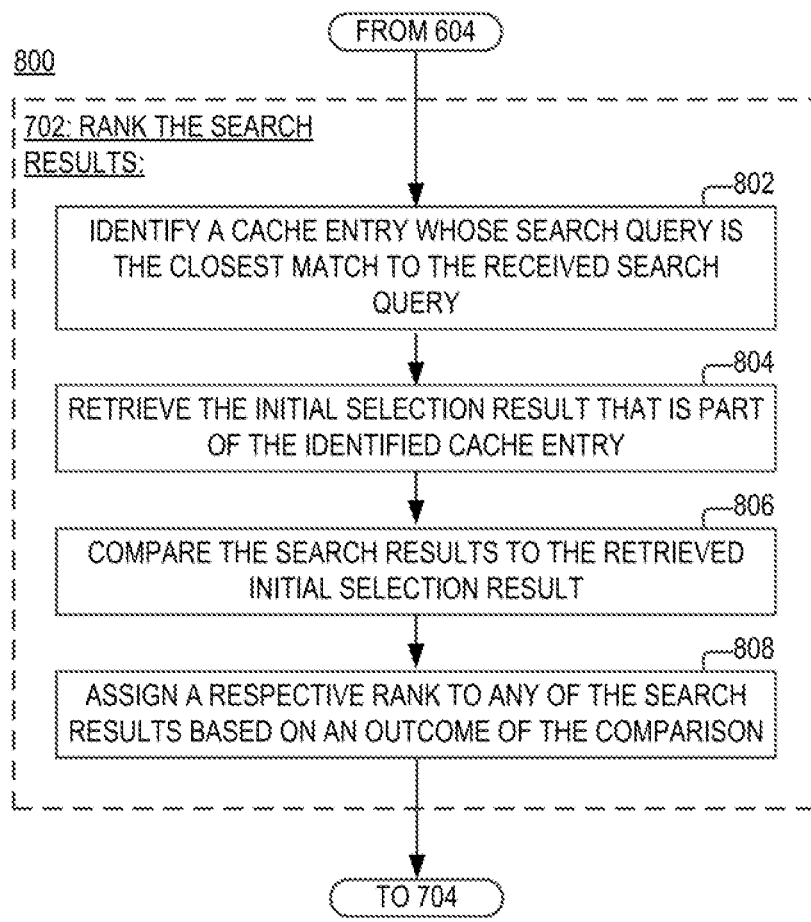
FIG. 8 is a flowchart of an example of a process, according to aspects of the disclosure.

FIG. 8 is a flowchart of an example of a process 800 for ranking search results, as specified by step 702 of the process 700.

At step 802, the cache 129 is searched to identify a cache entry 402 whose respective search query is the most similar to the search query received at step 602. For example, the engine 114 may obtain a first signature (e.g., a Word2Vec signature) for the search query (received at step 602). Next, for each (or at least some) cache entry 402 that is part of the cache 129, the engine 114 may generate a second signature which represents the search query that is part of this cache entry 402. As a result, the engine 114 may end up generating a plurality of second signatures, where each second signature represents a different search query that was submitted in the past (and which was cached in cache 129). Next, the engine 114 may compare the first signature to each of the second signatures. The comparison may yield a plurality of similarity scores, where each similarity score is indicative of the similarity between the first signature and a different one of the second signatures. The comparison may be performed using BERT or another similar technique. Next, the engine 114 may identify the highest similarity score among the generated similarity scores. Next, the engine 114 may identify the cache entry 402 that is associated with the highest similarity score—the entry associated with the highest similarity score may be one that contains the search query whose second signature yielded the highest similarity score. And finally, the engine 114 may determine that the identified cache entry 402 is the cache entry whose respective search query is the most similar to the search query received at step 602.

At step 804, the initial selection result that is part of the cache entry (identified at step 802) is retrieved.

At step 806, the search results (obtained at step 604) are compared to the initial selection result (obtained at step 804). As a result of the comparison, a plurality of similarity scores are generated. Each of the similarity scores indicates a degree of similarity between a different one of the search results and the initial selection result. The similarity scores may be generate by using BERT, or another similar model, and they may indicate a degree of semantic similarity.

At step 808, each (or at least one) of the search results (obtained at step 604) is assigned a respective rank based on an outcome of the comparison performed at step 806 (e.g., based on the similarity scores, etc.). For example, the search result that is the most similar to the initial selection result (e.g., among all of the search results obtained at step 604) may be ranked first, the second most similar search result may be ranked second, the third most similar search result may be ranked third, and so forth. In some implementations, only the search result that is the most similar to the initial selection result may be identified, without assigning a specific rank to that search result.

Figure 9:
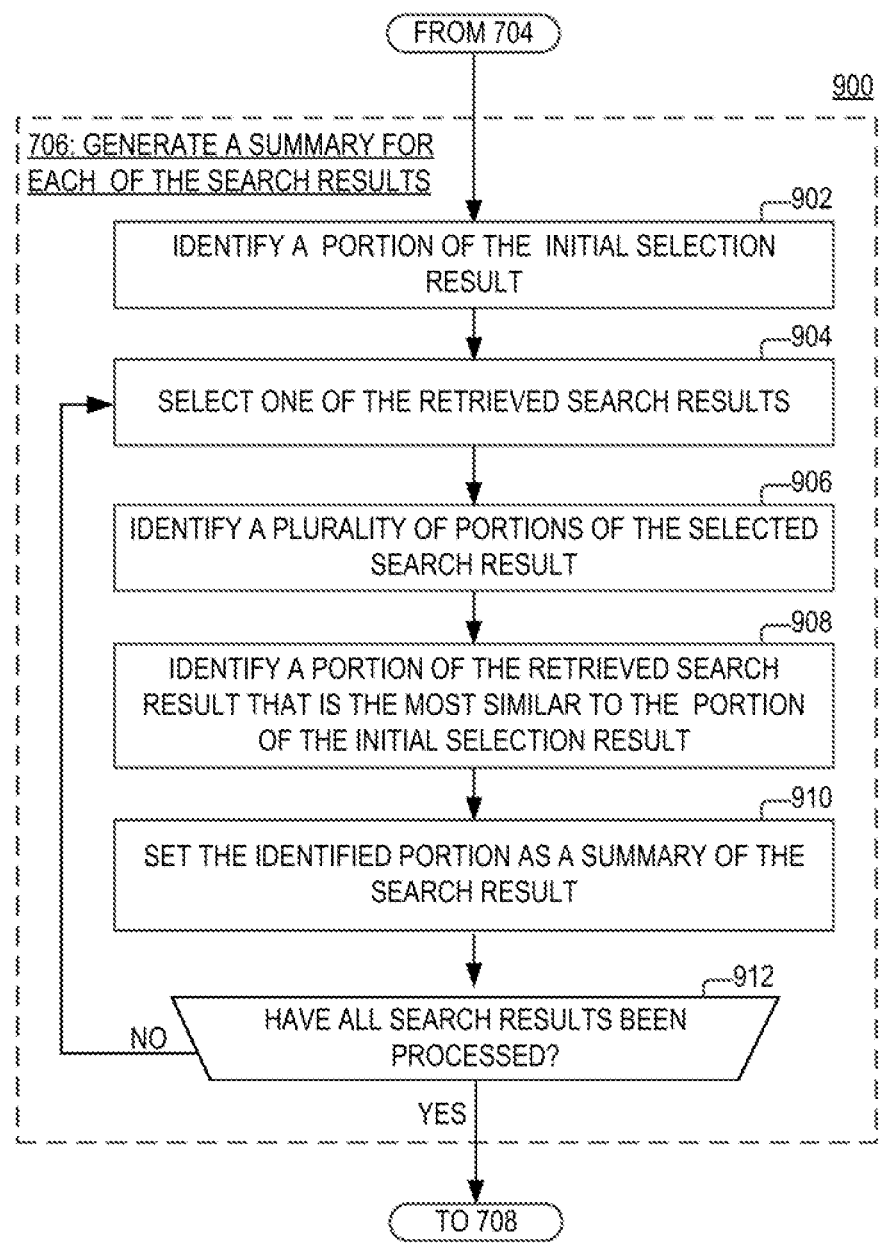
FIG. 9 is a flowchart of an example of a process, according to aspects of the disclosure.

FIG. 9 is a flowchart of an example of a process 900 for generating summaries of search results, as specified by step 706 of the process 700.

At step 902, a portion of the initial selection result (retrieved at step 804) is identified. As noted above, the identified portion may include one or more keywords that are part of the initial selection result. Each of the keywords may be either (i) a keyword that is part of a portion of the audio transcript 126 that corresponds to the initial selection result or (ii) a keyword that is part of a portion of the video transcript 128 that corresponds to the initial selection result. The present disclosure is not limited to any specific method for deciding which words in an initial selection result portion to select as keywords. In some implementations, a dictionary may be used that identifies words considered to have high informational content, which are suitable for selection as keywords (provided they are present in the initial selection result portion).

At step 904, one of the search results (obtained at step 604) is selected. The selected search result is one that has not been selected in a prior iteration of steps 904-910.

At step 906, a plurality of portions of the selected search result is identified. Each of the portions may include a part of the portion of the audio transcript 126, which corresponds to the search result. So, for example, if five (out of 100) sentences of the audio transcript 126 correspond to the search result, a portion of the search result may include one (or fewer than all) of the five sentences. Additionally or alternatively, each of the portions may include a part of the portion of the video transcript 128, which corresponds to the search result. So, for example, if the transcript of five PowerPoint™ slides (out of 100 slides that are transcribed in the video transcript 128) corresponds to the search result, a portion of the search result may include the transcript of one (or fewer than all) of the five slides.

At step 908, one of the portions of the selected search result that is the most similar to the portion of the initial selection result is identified. For example, the engine 114 may perform step 908 by determining a count of keywords from the portion of the initial selection result (identified at step 902) that are present in each of the search result portions (identified at step 906). Next, the engine 114 may determine that the search result portion that contains the most keywords is the "most similar portion".

At step 910, the search result portion (identified at step 908) is set as a summary for the search result (selected at step 904). As a result of this action, the text that constitutes the search result portion may become the summary of the search result (or at least a portion thereof).

At step 912, a determination is made if each of the search results (obtained at step 604) has already been selected once (at step 904) and processed subsequently (at steps 906-910). If all search results have been selected and processed, the process 900 proceeds to step 708. Otherwise, the process 900 returns to step 904, and steps 906-910 are repeated for another one of the search results.

Additionally or alternatively, in some implementations, the identified portion of the initial selection result may include one or more sentences (or a portion of a sentence) that are part of the initial selection result. Each of the sentences may be either (i) a sentence that is part of a portion of the audio transcript 126 that corresponds to the initial selection result or (ii) a sentence that is part of a portion of the video transcript 128 that corresponds to the initial selection result. In such implementations, the engine 114 may perform step 908 by comparing the portions of the search result to the portion of the initial selection result to produce a plurality of similarity scores. The comparison may be performed using BERT and/or another similar technique. After the plurality of similarity scores is produced, the portion of the search results, which has yielded the highest similarity score, may be determined to be one that is most similar to the portion of the initial selection result. Stated succinctly, the present disclosure is not limited to any specific method for comparing different portions of a search result to a portion of an initial selection result.

Figure 10:
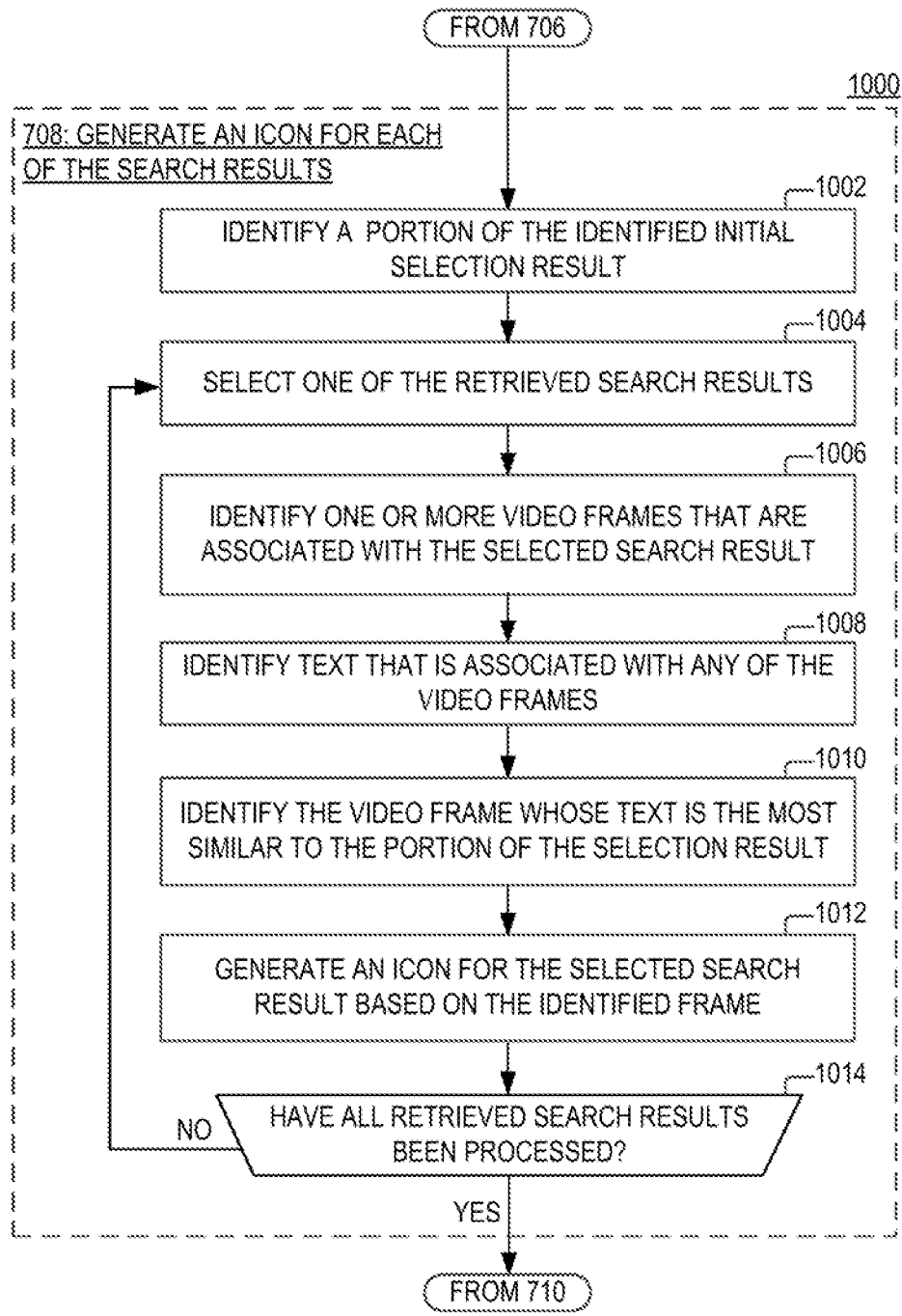
FIG. 10 is a flowchart of an example of a process, according to aspects of the disclosure.

FIG. 10 is a flowchart of an example of a process 1000 for generating icons for search results, as specified by step 708 of the process 700.

At step 1002, a portion of the initial selection result (retrieved at step 804) is identified (e.g., selected, etc.). As noted above, the identified portion may include one or more keywords that are part of the initial selection result. Each of the keywords may be either (i) a keyword that is part of a portion of the audio transcript 126 that corresponds to the initial selection result or (ii) a keyword that is part of a portion of the video transcript 128 that corresponds to the initial selection result.

At step 1004 one of the search results (obtained at step 604) is selected. The selected search result is one that has not been selected in a prior iteration of steps 1004-1012.

At step 1006 one or more video frames that are associated with the selected search result are identified. It will be recalled that the selected search result may include a respective one of sections 202 of the video file 122 (shown in FIG. 2). Thus, the video frames that are associated with the search result may be video frames that are part of the respective section 202.

At step 1008, text that is part of each of the plurality of video frames is identified. For example, the engine 114 may identify a plurality of text items that are associated with the plurality of video frames. Each of the text items may include sentence(s) or just word(s) that are depicted in one of the identified video frames. The text items may be retrieved from the video transcript 128. Additionally or alternatively, in some implementations, at step 1010 additional text may be retrieved that identifies the name (or another characteristic) of an object that is depicted in one of the frames. The additional text may also be retrieved from the video transcript 128. Each of the identified object names or object characteristics may be associated (e.g., in the video transcript 128) with the video frame where the object is depicted.

At step 1010, one of the video frames is identified whose text (or text item) is the most similar to the portion of the selection result. For example, the engine 114 may perform step 1008 by determining a count of keywords from the portion of the initial selection result (identified at step 1002) that are present in each of the text items (identified at step 1008). Next, the engine 114 may determine that the text item that contains the most keywords is the "most similar text item". The "text of a video frame", as noted above, may include text that is depicted in the video frame and identified using optical character recognition or the name or a characteristic of an object that is depicted in the video frame, which can be identified by using standard image recognition techniques.

At step 1012, an icon for the search result (selected at step 1004) is generated based on the video frame (identified at step 1010). In some implementations, the engine 114 may generate the icon by resizing and/or cropping the video frame (selected at step 1010).

At step 1014, a determination is made if each of the search results (obtained at step 604) has already been selected once (at step 1004) and processed subsequently (at steps 1006-1012). If all search results have been selected and processed, the process 1000 proceeds to step 710. Otherwise, the process 1000 returns to step 1004, and steps 1006-1012 are repeated for another one of the search results.

Additionally or alternatively, in some implementations, the identified portion of the initial selection result may include one or more sentences (or a portion of a sentence) that are part of the initial selection result. Each of the sentences may be either (i) a sentence that is part of a portion of the audio transcript 126 that corresponds to the initial selection result or (ii) a sentence that is part of a portion of the video transcript 128 that corresponds to the initial selection result. In such implementations, the engine 114 may perform step 1010 by comparing the text items (identified at step 1008) to the portion of the initial selection result to produce a plurality of similarity scores. The comparison may be performed using BERT and/or another similar technique. After the plurality of similarity scores are produced, the video frame associated with the text item which yielded the highest similarity score may be determined to be one that is most similar to the portion of the initial selection result.

Although the video file 122 is a recording of a video conference recording, it will be understood that the present disclosure is not limited to processing any specific type of video file As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. As noted above, in some implementations, the contract analyzer 114 may be configured to analyze a different type of contract (i.e. a contract that is not an NDA). In some such implementations, the contract analyzer 114 may utilize a user contract template, whose user provision vectors represent provisions in the user's form for the other type of contract.

To the extent directional terms are used in the specification and claims (e.g., upper, lower, parallel, perpendicular, etc.), these terms are merely intended to assist in describing and claiming the invention and are not intended to limit the claims in any way. Such terms do not require exactness (e.g., exact perpendicularity or exact parallelism, etc.), but instead it is intended that normal tolerances and ranges apply. Similarly, unless explicitly stated otherwise, each numerical value and range should be interpreted as being approximate as if the word "about", "substantially" or "approximately" preceded the value of the value or range.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Although the subject matter described herein may be described in the context of illustrative implementations to process one or more computing application features/operations for a computing application having user-interactive components the subject matter is not limited to these particular embodiments. Rather, the techniques described herein can be applied to any suitable type of user-interactive component execution management methods, systems, platforms, and/or apparatus.

While the exemplary embodiments have been described with respect to processes of circuits, including possible implementation as a single integrated circuit, a multi-chip module, a single card, or a multi-card circuit pack, the described embodiments are not so limited. As would be apparent to one skilled in the art, various functions of circuit elements may also be implemented as processing blocks in a software program. Such software may be employed in, for example, a digital signal processor, micro-controller, or general-purpose computer.

Some embodiments might be implemented in the form of methods and apparatuses for practicing those methods. Described embodiments might also be implemented in the form of program code embodied in tangible media, such as magnetic recording media, optical recording media, solid-state memory, floppy diskettes, CD-ROMs, hard drives, or any other machine-readable storage medium, wherein, when the program code is loaded into and executed by a machine, such as a computer, the machine becomes an apparatus for practicing the claimed invention. Described embodiments might also be implemented in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the claimed invention. When implemented on a general-purpose processor, the program code segments combine with the processor to provide a unique device that operates analogously to specific logic circuits. Described embodiments might also be implemented in the form of a bitstream or other sequence of signal values electrically or optically transmitted through a medium, stored magnetic-field variations in a magnetic recording medium, etc., generated using a method and/or an apparatus of the claimed invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments.

Also, for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

It will be further understood that various changes in the details, materials, and arrangements of the parts which have been described and illustrated in order to explain the nature of the claimed invention might be made by those skilled in the art without departing from the scope of the following claims.

The invention claimed is:

1. A method, comprising:
   receiving an instant search query that is associated with a video file;
   retrieving a plurality of search results in response to the instant search query, each of the search results corresponding to a different section in the video file;
   performing a search of a cache to identify a prior search query that matches the instant search query, the search being-performed after the plurality of search results is retrieved in response to the search query;
   retrieving, from the cache, an initial selection result that is associated with the prior search query, the initial selection result being a prior search result that was returned in response to the prior search query and selected first among a plurality of prior search results that were returned in response to the prior search query;
   comparing each of the search results to the initial selection result to determine a respective degree of similarity between the search result and the initial selection result;
   identifying a given one of the plurality of search results that has a highest degree of similarity to the initial selection result; and
   displaying the plurality of search results on a display device, wherein displaying the plurality of search results includes displaying the given search result in a manner that causes the given search result to stand out relative to the rest of the plurality of search results.

2. The method of claim 1, wherein displaying the given search result in a manner that causes the given search result to stand out includes at least one of: (i) displaying the given search result at a top of a list of the plurality of search results, (ii) displaying the given search result in a different color or font size than remaining ones of the plurality of search results, or (iii) displaying the given search to the side of the remaining ones of the plurality of search results.

3. The method of claim 1, wherein displaying the given search result includes generating a summary for the given search result based on the initial selection result and displaying the summary.

4. The method of claim 3, wherein generating the summary based on the initial selection result includes: identifying a first portion of the initial selection result, identifying a plurality of second portions of the given search result, comparing each of the second portions to the first portion, selecting one of the second portions based on an outcome of the comparison, and using the selected second portion as a basis for generating the summary.

5. The method of claim 1, wherein:
   displaying the given search result includes generating an icon for the given search result and displaying the icon adjacent to a respective link for the given search result; and
   generating the icon for the given search result includes selecting a frame from the section of the video file that corresponds to the given search result, the frame being selected based on the initial selection result, and generating the icon based on the selected frame.

6. The method of claim 5, wherein generating the icon based on the selected frame includes at least one of cropping and/or resizing the selected frame.

7. The method of claim 1, wherein the video file includes a recording of a teleconference.

8. A system, comprising:
a memory; and
at least one processor that is configured to perform the operations of:
receiving an instant search query that is associated with a video file;
retrieving a plurality of search results in response to the instant search query, each of the search results corresponding to a different section in the video file;
performing a search of a cache to identify a prior search query that matches the instant search query, the search being performed after the plurality of search results is retrieved in response to the search query;
retrieving, from the cache, an initial selection result that is associated with the prior search query, the initial selection result being a prior search result that was returned in response to the prior search query and selected first among a plurality of prior search results that were returned in response to the prior search query,
comparing each of the search results to the initial selection result to determine a respective degree of similarity between the search result and the initial selection result;
identifying a given one of the plurality of search results that has a highest degree of similarity to the initial selection result; and
displaying the plurality of search results on a display device,
wherein displaying the plurality of search results includes displaying the given search result in a manner that causes the given search result to stand out relative to the rest of the plurality of search results.

9. The system of claim 8, displaying the given search result in a manner that causes the given search result to stand out includes at least one of: displaying the given search result at a top of a list of the plurality of search results, (ii) displaying the given search result in a different color or font size than remaining ones of the plurality of search results, or (iii) displaying the given search to the side of the remaining ones of the plurality of search results.

10. The system of claim 8, wherein displaying any of the search results includes generating a summary for the given search result based on the initial selection result and displaying the summary.

11. The system of claim 10, wherein generating the summary based on the initial selection result includes: identifying a first portion of the initial selection result, identifying a plurality of second portions of the given search result, comparing each of the second portions to the first portion, selecting one of the second portions based on an outcome of the comparison, and using the selected second portion as a basis for generating the summary.

12. The system of claim 8, wherein:
displaying the given search result includes generating an icon for the given search result and displaying the icon adjacent to a respective link for the given search result; and
generating the icon for the given search result includes selecting a frame from the section of the video file that corresponds to the given search result, the frame being selected based on the initial selection result, and generating the icon based on the selected frame.

13. The system of claim 12, wherein generating the icon based on the selected frame includes at least one of cropping and/or resizing the selected frame.

14. The system of claim 8, wherein the video file includes a recording of a teleconference.

15. A non-transitory computer-readable medium storing one or more processor-executable instructions, which, when executed by at least one processor, cause the at least one processor to perform the operations of:
receiving an instant search query that is associated with a video file;
retrieving a plurality of search results in response to the instant search query, each of the search results corresponding to a different section in the video file;
performing a search of a cache to identify a prior search query that matches the instant search query, the search being performed after the plurality of search results is retrieved in response to the search query;
retrieving, from the cache, an initial selection result that is associated with the prior search query, the initial selection result being a prior search result that was returned in response to the prior search query and selected first among a plurality of prior search results that were returned in response to the prior search query,
comparing each of the search results to the initial selection result to determine a respective degree of similarity between the search result and the initial selection result;
identifying a given one of the plurality of search results that has a highest degree of similarity to the initial selection result; and
displaying the plurality of search results on a display device,
wherein displaying the plurality of search results includes displaying the given search result in a manner that causes the given search result to stand out relative to the rest of the plurality of search results.

16. The non-transitory computer-readable medium of claim 15, wherein displaying the given search result in a manner that causes the given search result to stand out includes at least one of: (i) displaying, the given search result at a top of a list of the plurality of search results, (ii) displaying, the given search result in a different color or font size than remaining ones of the plurality of search results, or (iii) displaying the given search to the side of the remaining ones of the plurality of search results.

17. The non-transitory computer-readable medium of claim 15, wherein:
displaying the given search result includes generating a summary for a the given search result based on the initial selection result and displaying the summary.

18. The non-transitory computer-readable medium of claim 17, wherein generating the summary based on the initial selection result includes: identifying a first portion of the initial selection result, identifying a plurality of second portions of the given search result, comparing each of the second portions to the first portion, selecting one of the second portions based on an outcome of the comparison, and using the selected second portion as a basis for generating the summary.

19. The non-transitory computer-readable medium of claim 15, wherein:
displaying the given search result includes generating an icon for the given search result and displaying the icon adjacent to a respective link for the given search result; and
generating the icon for the given search result includes selecting a frame from the section of the video file that corresponds to the given search result, the frame being selected based on the initial selection result, and generating the icon based on the selected frame.

20. The non-transitory computer-readable medium of claim 19, wherein generating the icon based on the selected frame includes at least one of cropping and/or resizing the selected frame.

* * * * *